United States Patent [19]

Armstrong

[11] Patent Number: 4,907,427
[45] Date of Patent: Mar. 13, 1990

[54] STEERING WHEEL SHAFT LOCK ASSEMBLY

[76] Inventor: Ennels D. Armstrong, 21514 Dequindre, Apt. 204, Warren, Mich. 48091

[21] Appl. No.: 290,435

[22] Filed: Dec. 27, 1988

[51] Int. Cl.⁴ ............................................. B60R 25/02
[52] U.S. Cl. ........................................ 70/252; 70/1.5; 70/184
[58] Field of Search ................. 70/252, 182, 183, 184, 70/185, 186, 1.5, 1.7

[56] References Cited

U.S. PATENT DOCUMENTS

| | | | |
|---|---|---|---|
| 2,004,434 | 6/1935 | Fitzgerald | 70/1.5 |
| 3,760,617 | 9/1973 | Westerdale | 70/1.5 |
| 4,643,009 | 2/1987 | Sato | 70/252 |
| 4,716,748 | 1/1988 | Watanuki | 70/252 |

Primary Examiner—Robert L. Wolfe
Attorney, Agent, or Firm—Reising, Ethington, Barnard, Perry & Milton

[57] ABSTRACT

A steering wheel lock assembly includes a plunger for mating engagement with an opening in a steering wheel shaft or a rack of a rack and pinion steering assembly and an actuating mechanism for selectively applying a force to move the plunger towards mating engagement with the shaft opening. A bi-directional biasing mechanism operatively connected between the actuating mechanism and the plunger biases the plunger towards engagement with the opening when the actuating mechanism applies force thereagainst and the plunger is unaligned with the opening and biasing the plunger out of engagement with the opening when force applied by the actuating mechanism is selectively removed and the opening is applying a torque on the plunger to retain the plunger therein such that release of the torque disengages the plunger. The assembly will prevent subsequent locking and unlocking of the device if an actuating cable to the device is disconnected. A latch operatively connected to an indicator prevents accidental locking of the device.

16 Claims, 9 Drawing Sheets

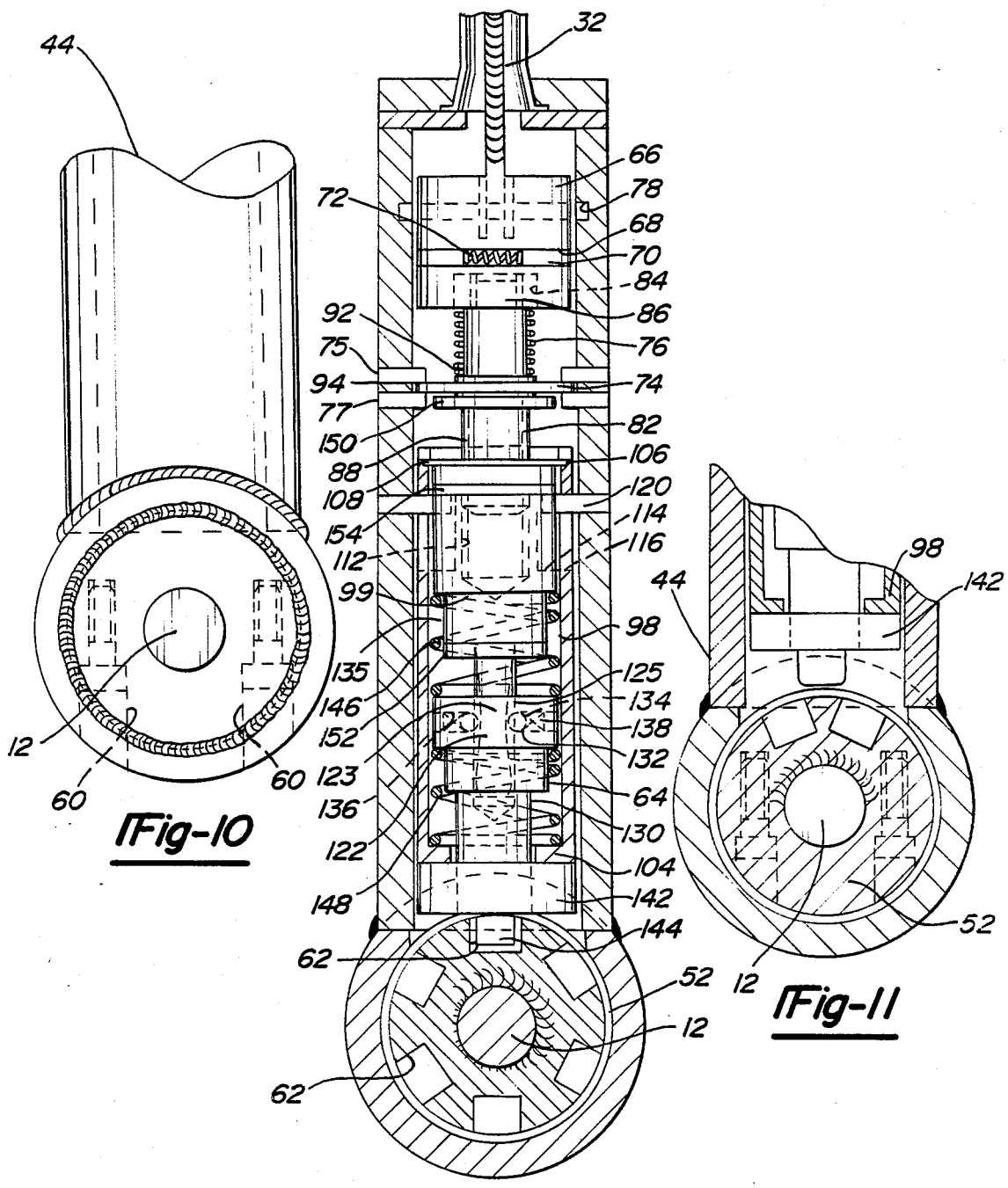

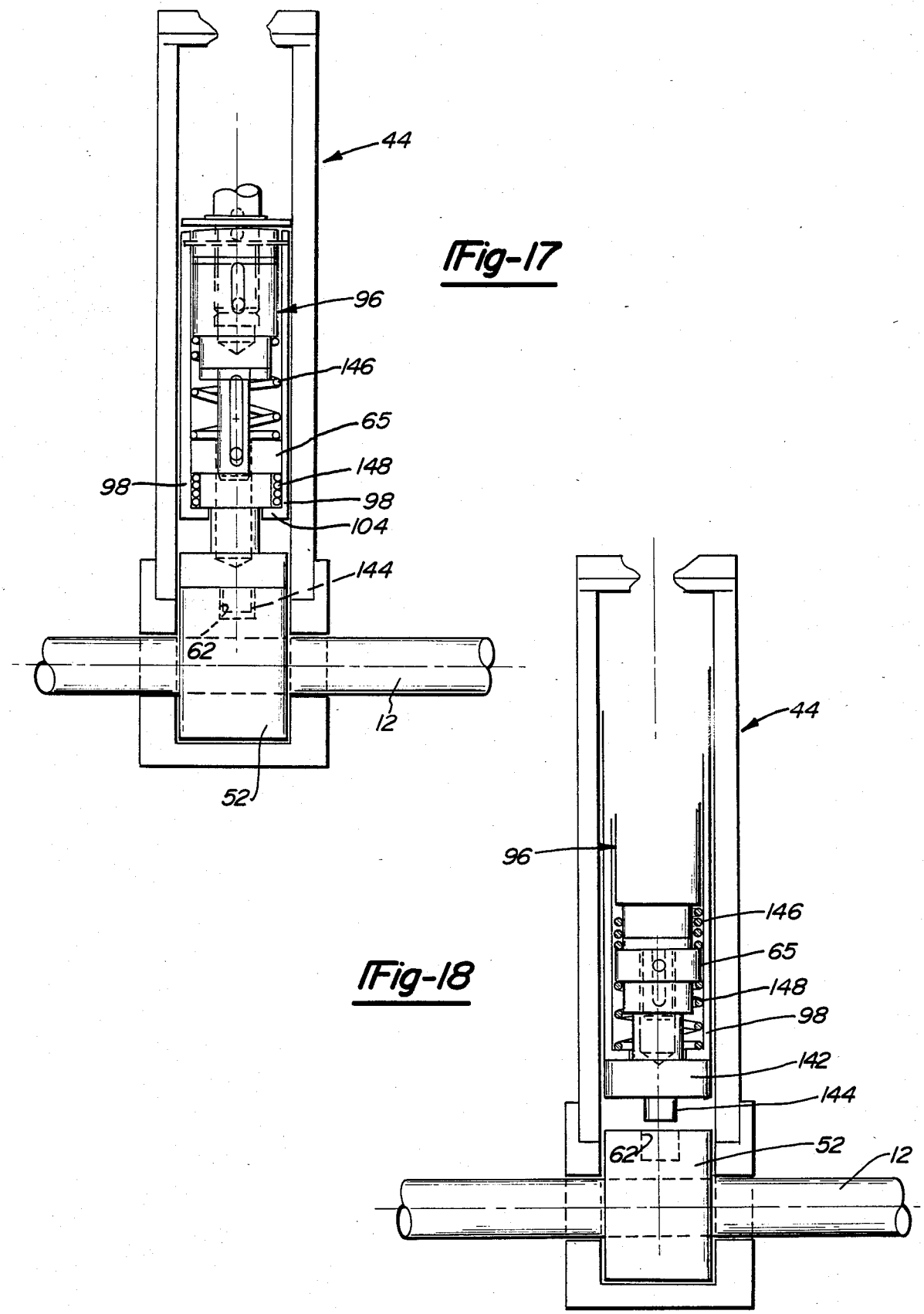

STEERING WHEEL SHAFT LOCK ASSEMBLY

TECHNICAL FIELD

The invention relates to an anti-theft device for use in a motor vehicle which locks the steering wheel shaft.

BACKGROUND OF THE INVENTION

In an attempt to prevent theft of motor vehicles, the steering wheel shaft is locked preventing rotational movement. Locking devices for locking the steering wheel shaft are actuated upon turning off the ignition via the automobile key.

An example of one such steering wheel lock assembly is disclosed in U.S. Pat. No. 4,029,168, issued to Kramer. A steering column lock inhibitor is applied to a key actuator lock which prevents the steering wheel from moving from its unlocked condition. The inhibitor has an integral lever extending to a finger rest in order that an operator manually depresses the lever which enables the ignition key to be turned counter clockwise to the ignition-off steering wheel lock position. The locking member is spring actuated so that if it is not aligned with a hole in the steering column, once the steering wheel is rotated, the steering wheel will lock.

Other examples of steering wheel lock assemblies include U.S. Pat. No. 4,716,748, issued to Watanuki et al which discloses a key actuated or keyless electromechanical steering lock device. A "back-up" means holds a locking bar in the steering shaft unlocking condition when the ignition key is turned to its on position with the motor running. U.S. Pat. No. 4,719,460, issued to Takechi et al discloses a keyless or electronic code entry system which provides unlocking of the steering column. The specific locking device is not disclosed. U.S. Pat. No. 4,683,737, in the name of the inventor of the subject application, discloses a steering mechanism locking device which is remotely actuatable. The device acts on the steering mechanism from the power steering mechanism which acts on the wheels themselves. The problem with this type of device is that each vehicle includes a different configuration of the steering mechanism, therefore, the device needs to be adapted and redesigned for each type of vehicle.

Other problems with these devices are that a thief may tamper the device and actuate the lock to the unlocked position. There may be a force on the ignition key if the steering shaft is torqued by the vehicle wheels. There is no protective latch to ensure against locking of the steering wheel shaft when in an unlocked condition and which will automatically move out of engagement absent manual intervention.

SUMMARY OF THE INVENTION AND ADVANTAGES

A steering wheel lock assembly includes engagement means for mating engagement with an opening in a steering wheel shaft, actuating means for selectively applying a force to move the engagement means towards mating engagement with the opening and bidirectional biasing means operatively connected between the actuating means and the engagement means for biasing the engagement means towards engagement with the opening when the actuating means applies force thereagainst and the engagement means is unaligned with the opening and biasing the engagement means out of engagement with the opening when the force applied by the actuating means is selectively removed and the opening is applying a torque on the engagement means to retain the engagement means therein such that release of the torque disengages the engagement means.

The advantages of the invention include a tamper proof lock device by use of the inhibit means. The assembly remains locked when torque is exerted on the attachment means from the steering shaft in order to eliminate any force on the ignition key. A latching means insures the engagement means does not accidentally engage the steering wheel shaft when unlocked. Furthermore, the assembly provides a coded system such that the steering wheel shaft device may be locked and unlocked only in response to the code.

DESCRIPTION OF THE DRAWINGS

Other advantages of the present invention will be readily appreciated as the same becomes better understood by reference to the following detailed description when considered in connection with the accompanying drawings wherein:

FIG. 9 is a partially broken away view of the locking means corresponding to the view of FIG. 6;

FIG. 10 is a side view of the housing means and attachment means of the subject invention;

FIG. 11 is a partially broken away side view of the housing means and attachment means;

FIG. 17 is a partially broken away view of the locking means in the unlocked and torqued position; and FIG. 18 is a partially broken away view of the locking means in the locked and unaligned position.

DESCRIPTION OF THE PREFERRED EMBODIMENT

Figure 1:
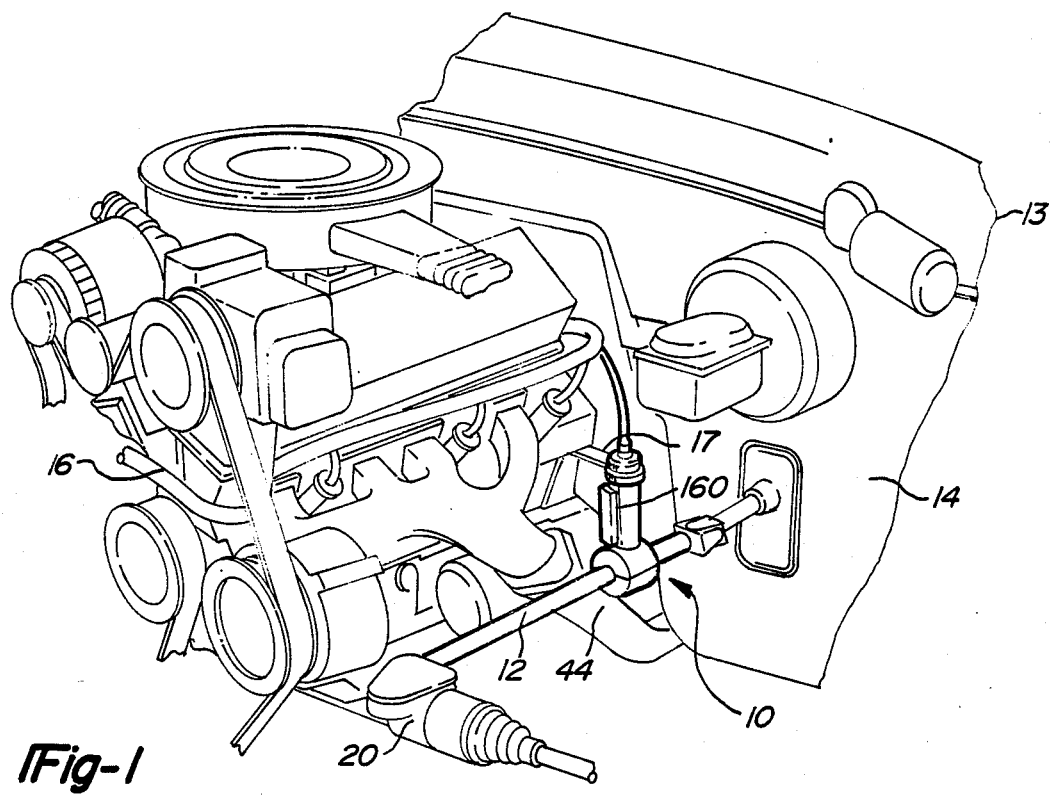
FIG. 1 is a perspective view of the subject invention situated in the engine compartment of the vehicle.

A steering wheel lock assembly constructed in accordance with the present invention is generally shown at 10 in the Figures. The assembly 10 is mounted about a steering wheel shaft 12, the shaft 12 being connected through the fire wall 14 of the vehicle 13 to the steering wheel in the passenger compartment and to the power steering mechanism 20. The assembly 10 is attached to the engine 16 by bracket 17. Alternatively, a bracket can connect the assembly 10 to a wall of the vehicle 13.

Figure 2:
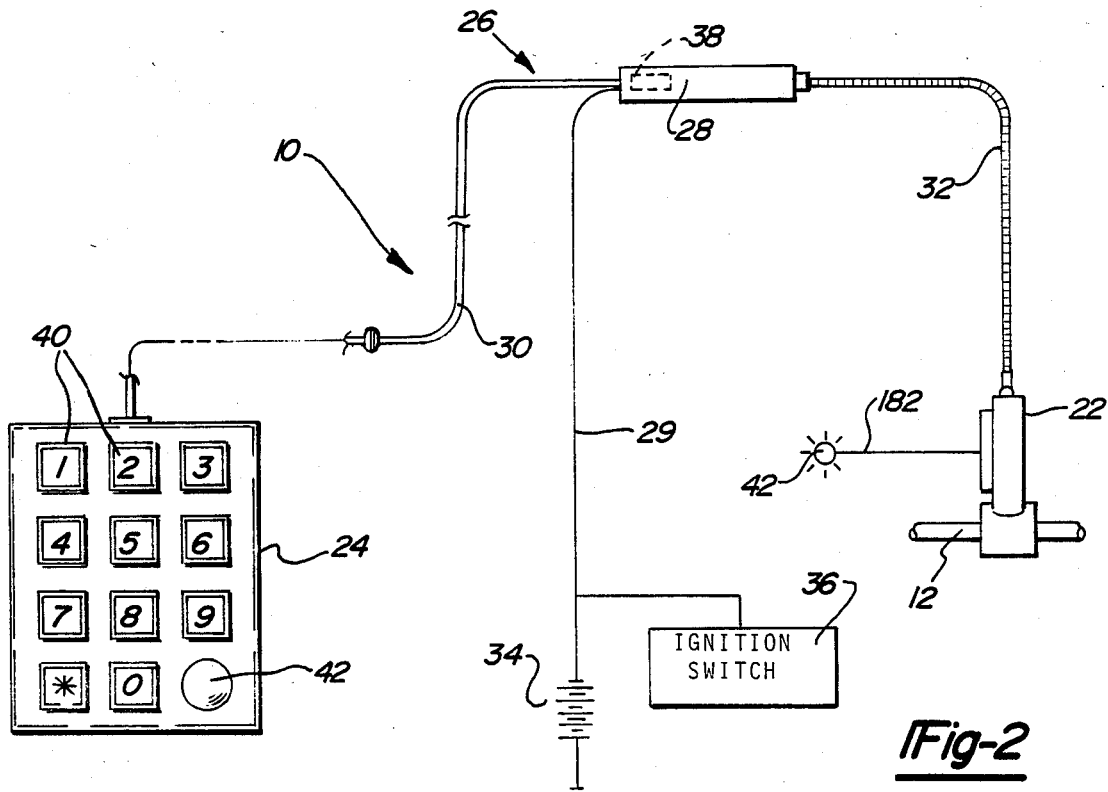
FIG. 2 is a block diagram of the subject invention.

FIG. 2 generally shows the components of the present invention. The assembly 10 includes a locking assembly 22 adapted to be connected to the steering wheel shaft 12 for locking the shaft 12 to prevent rotation thereof and unlocking the shaft 12 to allow rotation thereof. A remote control 24 produces a lock signal and unlock signal and is generally located in the passenger compartment of the vehicle 13 for general access by a driver or passenger. The signal is communicated to the lock assembly 22 which is actuated to the locked and unlocked conditions.

A motor 28 is operatively connected to the remote control 24 for rotating in a first direction in response to receiving the lock signal and rotating in a second direction in response to receiving the unlock signal. Electrical wires, schematically shown at 30, interconnect the remote control 24 to the motor 28 for transmitting the electrical signal representative of the lock and unlock signals. A flexible drive cable 32 connects the motor 28 to the lock assembly 22. The motor 28 is capable of rotating the drive cable 32 in response to the lock and unlock signals. A battery 34 and an ignition switch 36 are connected to the motor 28 by a wire conductor 29.

The motor 28 can include a programmable device 38, such as a microprocessor, for receiving the lock and unlock signals from the remote control 24, power from the battery 34, and the ignition switch 36 whether turned on or off. The microprocessor can be programed to control the motor 28 to rotate a number of rotations in the first direction in response to receiving the lock signal and in the second direction in response to receiving the unlock signal.

The remote control 24 includes a touch tone keypad such as used with a telephone. The remote control 24 is substantially similar to that described in U.S. Pat. No. 4,683,737 issued to the same inventor of the present invention. The remote control 24 includes a key 40 for each number zero (0) through nine (9), and an asterisk (*). The remote control 24 also includes a light indicator 42 which indicates to the user when the assembly 10 is in the locked and unlocked conditions. The remote control 24 can include a microprocessor or similar circuitry to compare the depression of the keys 40 to a first combination to produce a lock signal and to a second combination to produce an unlock signal. The remote control can be programed to allow a predetermined number of attempts, after which correct code depression will not be acknowledged until the ignition switch is turned on and off again, or visa versa.

Figure 3:
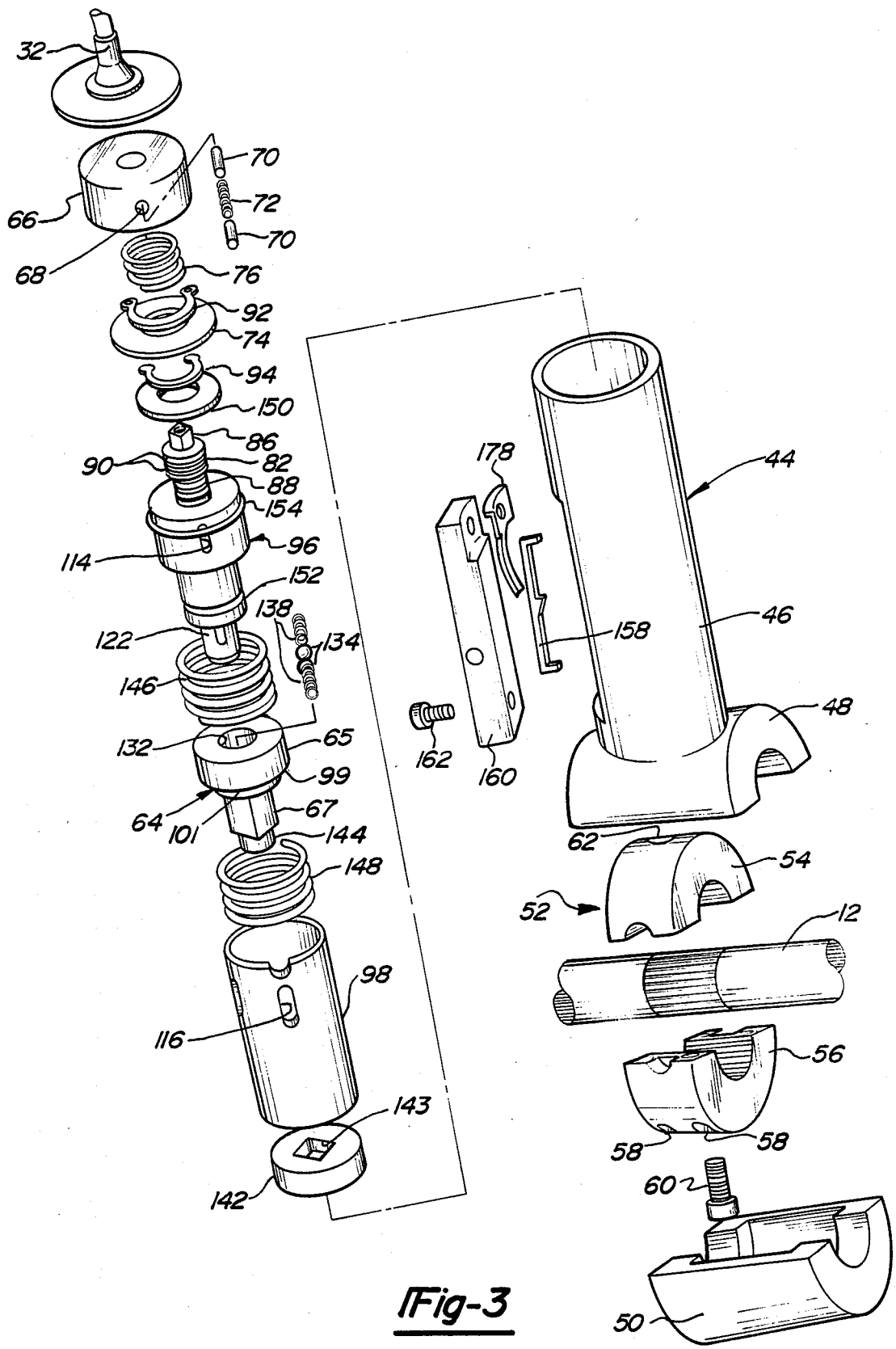
FIG. 3 is an exploded view of the locking means of the subject invention.
Figure 4:
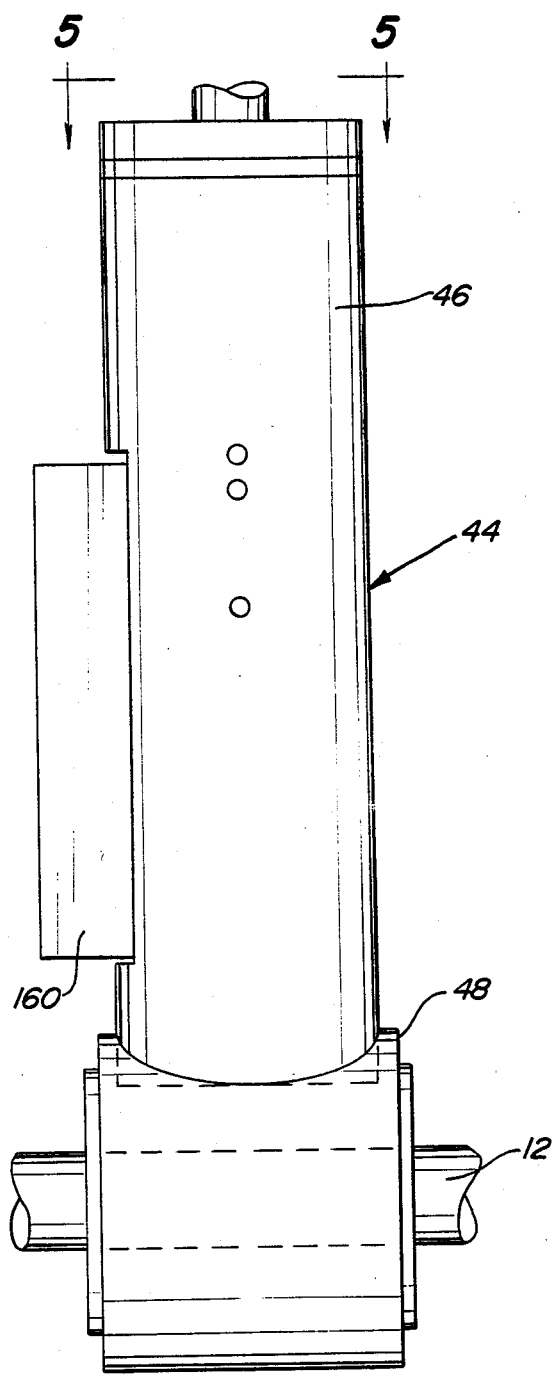
FIG. 4 is a side view of the housing means of the subject invention perpendicular to the axis of the steering wheel shaft.
Figure 5:
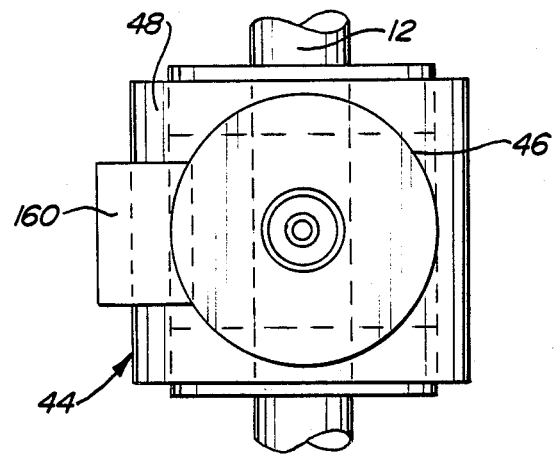
FIG. 5 is a top view taken substantially along lines 5—5 in FIG. 4.
Figure 6:
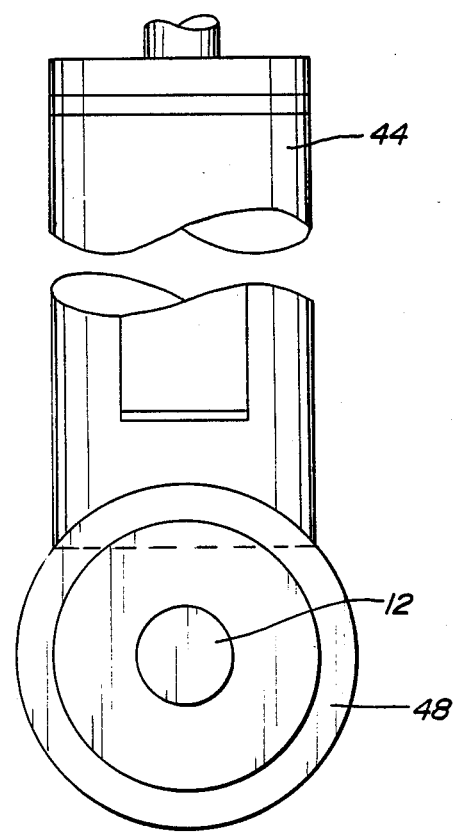
FIG. 6 is a side view of the housing means of the subject invention taken along the axis of the steering wheel shaft.
Figure 7:
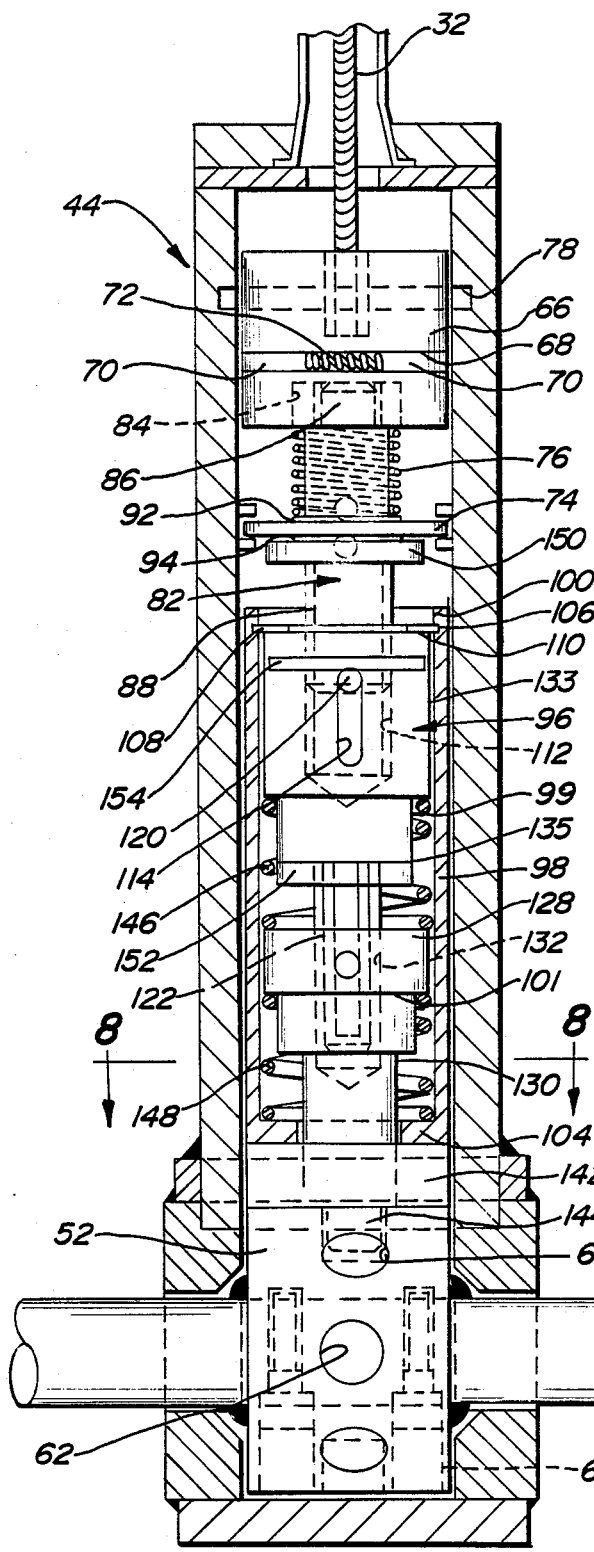
FIG. 7 is a partially broken away view of the locking means corresponding to the view of FIG. 4.
Figure 8:
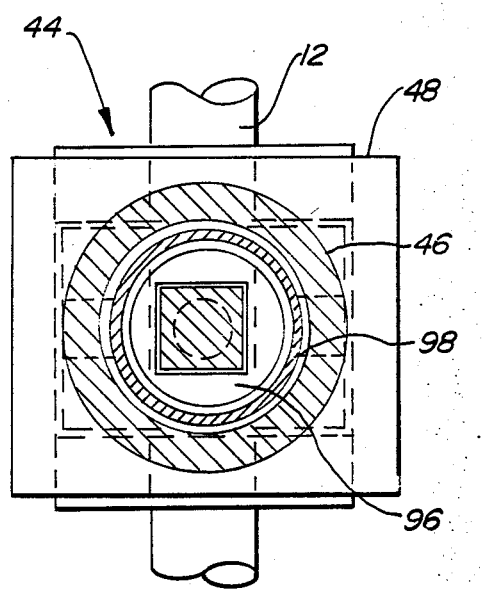
FIG. 8 is a top view taken substantially along lines 8—8 of FIG. 7.

The lock assembly 22 is generally shown in FIGS. 3 and 7. Generally, the lock assembly 22 includes a plunger 64 which provides engagement means for mating engagement with openings in the steering wheel shaft 12. An actuating mechanism selectively applies a force to move the plunger 64 towards mating engagement with openings in the shaft 12. A bidirectional biasing mechanism operatively connected between the actuating mechanism and the plunger 64 biases the plunger 64 towards engagement with the openings in the steering wheel shaft 12 when the actuating mechanism applies force thereagainst and the plunger 64 is unaligned with the openings and biases the plunger 64 out of engagement with the openings when the force applied by the actuating mechanism is selectively removed and the opening is applying a torque on the plunger 64 to retain the plunger 64 therein such that release of the torque disengages the plunger.

More specifically, the lock assembly 22 includes an outer housing 44. The steering wheel shaft 12 may be rotated while the outer housing 44 is fixedly retained relative to the vehicle 13. As shown in FIG. 3, the outer housing 44 comprises a generally cylindrical member 46 perpendicularly attached or welded to a semicircular elongated member 48, and a second semicircular elongated member 50 such that the elongated members 48,50 are clamped about the steering wheel shaft 12 and welded in facing engagement. The outer housing 44 encompasses or houses the entire lock assembly 22.

A rotor 52 is adapted to be mounted on the steering wheel shaft 12 for rotation therewith. The rotor 52 includes a first half 54 and a second half 56. Each half 54,56 includes threaded bores 58 which are aligned when the members 54,56 are clamped about the steering wheel shaft 12. Screws 60 are threaded through the bores 58 for securing the members 54,56 to one another. Adjacent surfaces of the steering wheel shaft 12 and members 54,56 are splined to provide connecting means for fixedly connecting the rotor 52 about the steering wheel shaft 12. The splines establish a fixed connection so that the rotor 52 will rotate with the steering wheel shaft 12 and visa versa. The outer circumferential surface of the rotor 52 includes spaced apart openings 62. The openings 62 are engaged by a shear pin 144 extending axially from the plunger 64 to prevent rotation of the rotor 52 and therefore the steering wheel shaft 12.

A hollow cylindrical container or inner housing 98 having a first end 100 and second end 102 is contained within the outer housing 44 for sliding movement relative thereto. The inner housing 98 is operatively connected to the actuating mechanism which applies the force to move the plunger 64 towards mating engagement with one of the openings 62, as will be described below, the inner housing 98 moving axially within the outer housing 44. The plunger 64 includes a body portion 65 contained within the inner housing 98 and the shear pin 144 extending therefrom for mating engagement with one of the openings 62 upon axial movement of the inner housing towards the rotor 52. An elongated portion 67 which is square when viewed in sagited cross section extends between the body portion 65 and shear pin 144. The inner housing 98 includes an end cap 142 fixedly secured thereto. The end cap 142 included a squared opening 143 extending therethrough. The elongated portion extends through the squared opening 143 such that the squared opening prevents rotation of the plunger 64 relative to the inner housing 98.

The bidirectional biasing mechanism includes a first spring 146 contained within the inner housing 98 against one side of the body portion 65 for biasing the plunger 64 towards engagement with one of the openings 62 and a second spring 148 contained within the inner housing 98 on the opposite side of the body portion 65 biasing the plunger 64 away from engagement with any of the openings 62. The springs 146,148 allow the plunger 64 to effectively float within the housing 98 while moving with the housing 98 as the housing 98 moves axially within the outer housing 44. The significance of this bi-directional biasing mechanism is illustrated in FIGS. 17 and 18.

FIG. 17 shows the inner housing 98 moved axially away from the rotor 52 in response to an unlocked signal; however, the shear pin 144 is retained within the opening 62 due to torque applied on the steering wheel shaft 12 by the tires of the vehicle. The second spring 148 is compressed by the body portion 65 and end wall 104 of the inner housing 98 so as to apply a biasing force against the plunger 64. Upon release of the torque on the rotor 52 by the steering wheel shaft 12, the shear pin 144 is released and the spring 148 biases the plunger 64 to the unlocked condition.

FIG. 18 shows the inner housing 98 moved towards the rotor 52 in response to a lock signal; however, the shear pin 144 is not aligned with an opening 62. The first spring 144 in this condition is compressed between the body portion 65 of the plunger 64 and the actuating mechanism described below. Upon rotation of the steering wheel shaft 12 and eventual alignment of an opening 62 with the shear pin 144, the spring 146 biases the plunger 64 to engage the opening 62 thereby locking the steering wheel shaft. Since turning of the ignition is independent of the remote control 24, engagement of the locking mechanism is independent of the turning on and off of the engine.

The rotary movement of the drive cable 32 is translated into axial movement of the plunger 64 by the actuator mechanism. The actuator mechanism includes a drive connector member 66 contained within the outer housing 44 for actuating sliding movement relative thereto and is operatively connected to the drive cable 32 for rotational movement driven thereby. A drive screw member 82 has a first end 86 in rotationally locked engagement with the drive connector member 66. More specifically, the drive connector member 66 includes a bore 84 which is square when viewed in cross section. The squared end portion 86 of the drive screw member 82 is in mating engagement with the squared bore 84.

The drive screw member 82 also includes a second threaded end portion 88.

The drive screw member 82 extends through a brace member or washer 74 and is supported longitudinally at a position therethrough The drive screw member 82 includes a pair f grooves 90 extending about the circumference thereof. A pair of retaining rings 92,94 are clamped within the grooves 90 such that a portion of the retaining rings 92,94 extend outwardly from the drive screw member 82. The brace member 74 is located between the retaining rings 92,94 and fixed axially relative to the outer housing 44 by screws 75 and 77 so that the drive screw member 82 will not slide axially within the outer housing 44.

The actuator mechanism includes a driven member generally indicated at 96 contained within the inner housing 98 for axial sliding movement relative thereto and in abutting contact with the first spring 146. The inside of the inner housing 98 includes a circumferential retaining groove 106 near the first member 96 and within the retaining groove 106 of the inner housing 98 such that the inner housing 98 moves/slides with the driven member 96 in response to rotation of the drive screw member 82 as described below.

The driven member 96 includes a threaded bore 112 in one end thereof in mating threaded engagement with the threaded end portion 88 of the drive screw member 82. The outer housing 44 includes an anti-rotation mechanism connected to the inner housing 98 and the driven member 96 for preventing relative rotation therebetween whereby rotation of the drive cable 32 rotates the drive screw member 82 so as to thread or unthread into the threaded bore 112. Since the drive screw member 82 is prevented from axial movement by the brace member 74 and the inner housing 98 and driven member 96 are prevented from rotation but are axially moveable, the threading and unthreading of the drive screw member 82 into the bore 112 actuates the driven member 96 and abutting plunger 64 to move axially. This axial movement moves the plunger 64 towards or away from engagement of the shear pin 144 of the plunger 64 with one of the openings 62 in the rotor 54.

The driven member 96 includes an annular shoulder 99. The first spring 146 has one end abutting against the shoulder 99 and a second end abutting against one side of the body portion 65 of the plunger 64. The body portion 65 has an opposite side including an annular shoulder 101. The inner housing 98 includes a radially inwardly extending flange 104. The second spring 148 includes a first end abutting the shoulder 101 of the body portion 65 and a second end abutting the radially inwardly extending flange 104. The retaining ring 108 is clamped about the upper end 110 of the driven member 96 and within a retaining groove 106 of the inner housing 98 such that the driven member 96, plunger 64, and first and second springs 146,148 are contained within the inner housing 98. The inner housing 98 thereby defines an internal piston within the lock assembly 22 which, as a unit, is axially moved by rotation of the drive cable 32 translated into axial linear movement by the drive screw member 82. As described above, the two springs 146,148 allow for locking actuation of the assembly when the openings 62 are misaligned and further allow for unlocking of the assembly when torque retains the shear pin 144 within one of the openings 62.

The body portion 65 of the plunger 64 includes an internal bore 132. The driven member 96 includes a rod portion 122 extending therefrom axially through the first spring 146 and in mating engagement with the bore 132 in the body portion 65 of the plunger 64. The rod portion 122 includes an axial center portion 123, as shown in FIG. 9. The axial center portion 123 is the center portion of the rod portion 122 midway along the length thereof. The body portion 65 includes a pair of coaxial ports 136 extending therethrough in a direction radially outwardly relative to the bore 132. The rod portion 122 includes a groove 125 along the length thereof which tapers inwardly towards the axial center portion 123. A spring 138 and bearing 134 mounted on the end thereof is disposed in each of the ports 136 wherein the spring 138 engages the body portion 65 and the bearings each engage one of the grooves 125 thereby providing centering means for urging the body portion 65 towards being seated over the axial center portion 123. In other words, the combination of the bearings 134, spring 138 and tapered groove 125 urge the body portion 65 to be centered on the midportion 123 of the rod portion 122 thereby urging the plunger 64 to a neutral position. The springs 146,148 contribute to this centering function.

The present invention provides a mechanism for inhibiting disengagement of the plunger 64 from the rotor 52 when the drive cable 32 is cut along the length thereof. More specifically, the assembly 10 includes the plate 74 fixed between pins 75,77. The plate 74 is disposed between the drive connector member 66 and the driven member 96. The drive screw member 82 extends through the fixed plate 74 and is able to rotate relative thereto but is fixed axially relative to outer housing 4 as described above. The assembly 10 includes a spring 76 disposed between the fixed plate 74 and the driver connector member 66 for biasing the driver connector member 66 towards the drive cable 32. The drive cable 32 is in compression between the motor 28 and the drive connector member 66 thusly providing a force opposite to that force applied by spring 76. Accordingly, cutting of the drive cable 32 allows the spring 76 to bias the drive connector member 66 away from the direction of the rotor 52 and out of engagement with the squared end portion 86. Once out of engagement, the pin 82 cannot be rotated by manipulation of the drive cable 32. Hence, cutting of the drive cable 32 by a theif renders the device fixed in the locked position.

The drive connector member 66 includes a bore 68 extending therethrough. The outer housing 46 includes an annular recess 78 therein. A pair of pin members 70 are biased radially outwardly by a spring member 72 disposed therebetween within the bore 68. The pin members 70 cooperate as inhibitor means whereby cutting of the drive cable 32 allows the spring 76 to axially bias the drive connector member 66 axially through the outer housing 44 out of engagement with the drive screw members 82 and to align the outwardly biased pin members 70 with the recess 78. The pin members 70 seat in the recess 78 to prevent any further movement of the drive connector member 66. This inhibition of movement of the drive connector member 66 our of engagement with drive screw member 82 renders the device locked and incapable of unlocking by any manipulation of cable 32. This inhibitor means effectively prevents disengagement of the plunger 64 from any one of the openings 62 when the assembly is in the locked condition by cutting of cable 32.

It is the drive cable 32 being in compression which maintains the drive connector member 66 in the uninhibited condition. Cutting of the drive cable 32 releases the compressive force applied thereby on the drive connector member 66 allowing it to axially move into the inhibited position.

A first buffer or rubber washer 150 is located between the plate member 74 and the plate 106 for preventing metal to metal binding when the inner housing 98 is moved to the unlocked condition. A second buffer or rubber washer 152 is located between the driven member 96 and plunger 64. The second buffer 152 prevents metal to metal binding when the locking assembly 22 is moved to its locked condition.

The driver member includes vertical opposing slotted grooves 114. The inner housing 98 includes vertical opposing slots 116,188 which are aligned with the grooves 114. The outer housing 44 includes opposing pins 120 secured thereto which engage the slots 116 and grooves 114 thereby maintaining the driver member 96 and inner housing 98 nonrotatable.

A third buffer or rubber washer 154 is located within a groove on the driven member 96 and aligned with the upper most position of the grooves 114 to prevent metal to metal binding of the pins 120 within the slots 116 and grooVes 114.

Figure 12:
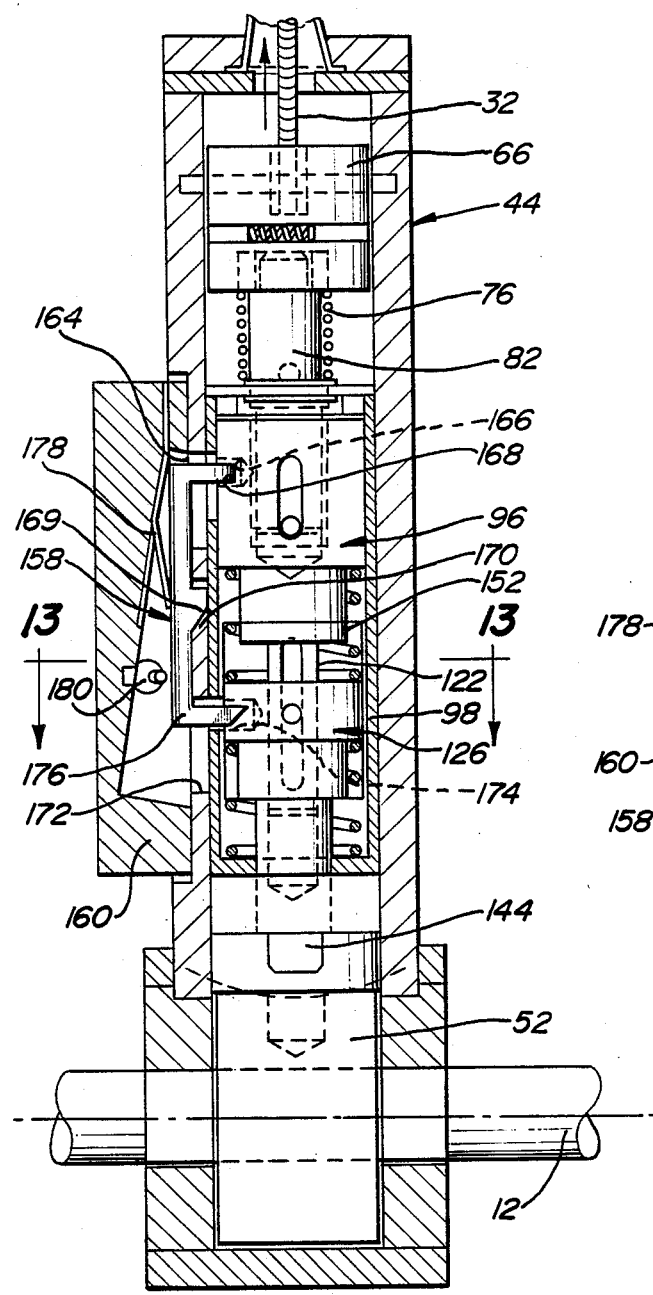
FIG. 12 is a partially broken away view of the locking means with the latch means in the latched position.
Figure 13:
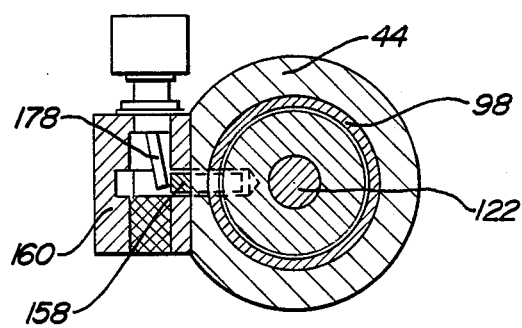
FIG. 13 is a partially broken away end view taken along lines 13—13 of FIG. 12.

The assembly 10 includes a latch 158 for maintaining the plunger 64 in a latched position disengaged from the rotor 52 when the driven member 96 is in the unlocked condition and for automatically releasing the plunger 64 to the unlatched position when the driven member 96 is actuated to drive the plunger 64 into one of the openings 62. FIGS. 12 and 13 illustrate the latch 158 in the latched position and FIGS. 14 and 15 illustrate the latch 158 in its unlatched position.

A latch housing 160 secured to the outer housing 44 by fasteners 162, such as bolts. The outer housing 44 includes a first slot 164. The driven member 96 includes a bore 166 for receiving a first end 168 of the latch 158 through the slot 164. The first end 168 is continuously pivotally engaged in the bore 166. The outer housing includes a ramped indentation 170 and the latch 158 includes an angled protrusion 169 near the center of the latch 158 in mating engagement with the ramped indentation 170 when the driven member 96 is in the unlocked condition and the latch 158 is engaged with the plunger 64 so that when the driven member 96 is moved towards the locked condition, the angled protrusion 169 slides along the ramped indentation 170 disengaging the latch 158 from the plunger 64 126. The outer housing 44 includes a second slot 172 and the plunger 64 includes a latch bore 174. The latch member 158 includes a second end 176 for engaging the plunger 64 by the latch bore 174 through the second slot 172.

Figure 14:
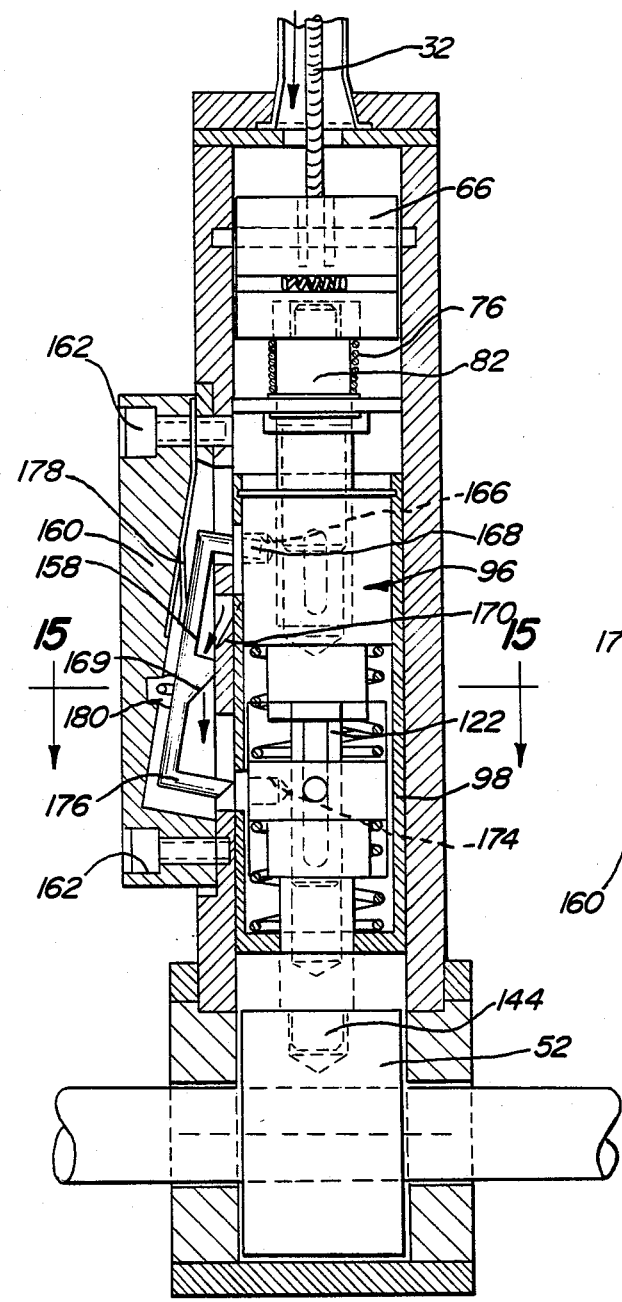
FIG. 14 is a partially broken away view of the locking means with the latch means in the unlatched position.
Figure 15:
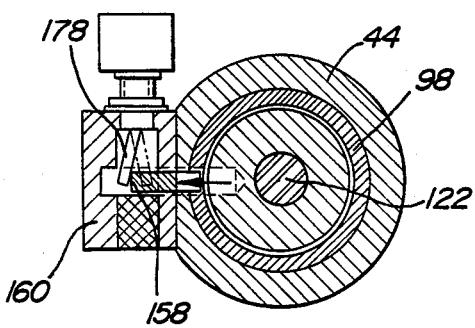
FIG. 15 is a partially broken away end view taken along lines 15—15 of FIG. 14.
Figure 16:
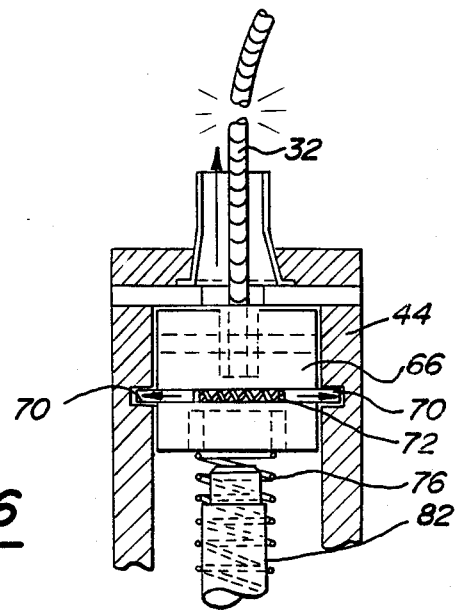
FIG. 16 is a partially broken away inhibit means in the locked condition.

As best illustrated in FIG. 14, as the driven member 96 moves towards its locked condition, the angle protrusion 169 engages the ramped indentation 170 and pushes the second end 176 out of engagement with the plunger 64. A latch biasing spring 178 is operatively connected between the latch housing 160 and the latch 158 for biasing the latch 158 into engagement with the plunger 64. A switch 180, such as a spring return switch, is attached to the latch housing 160 for producing an indication signal when the latch 158 comes into contact therewith when the latch 158 is moved to its unlatched position.

The light or visual indicator 42 is operatively connected to the switch 180 for receiving the indicator signal and visually indicating that the latch 158 is out of engagement with the plunger 64. A wire 182 may interconnect the switch 180 with the indicator light 42.

The present assembly thereby provides a remote controlled locking mechanism which engages and disengages a rotor mounted on a steering wheel shaft independent of the ignition switch. That is, the ignition of the vehicle is turned on and the locking mechanism is independently actuated to a locked or unlocked condition. Release and engagement of the locking opening 62 of the rotor 52 are made independent of the locking and unlocking actuation by the internal dual spring mechanism within the inner housing 98. The invention further provides a latch mechanism for securing the assembly in its unlocked condition and indicating on indicator light 42 in the passenger compartment that the latch is engaged. Further, the invention provides an inhibit mechanism preventing axial disengagement of the locking mechanism as a result of cutting of the drive cable to the locking mechanism.

Figure 19:
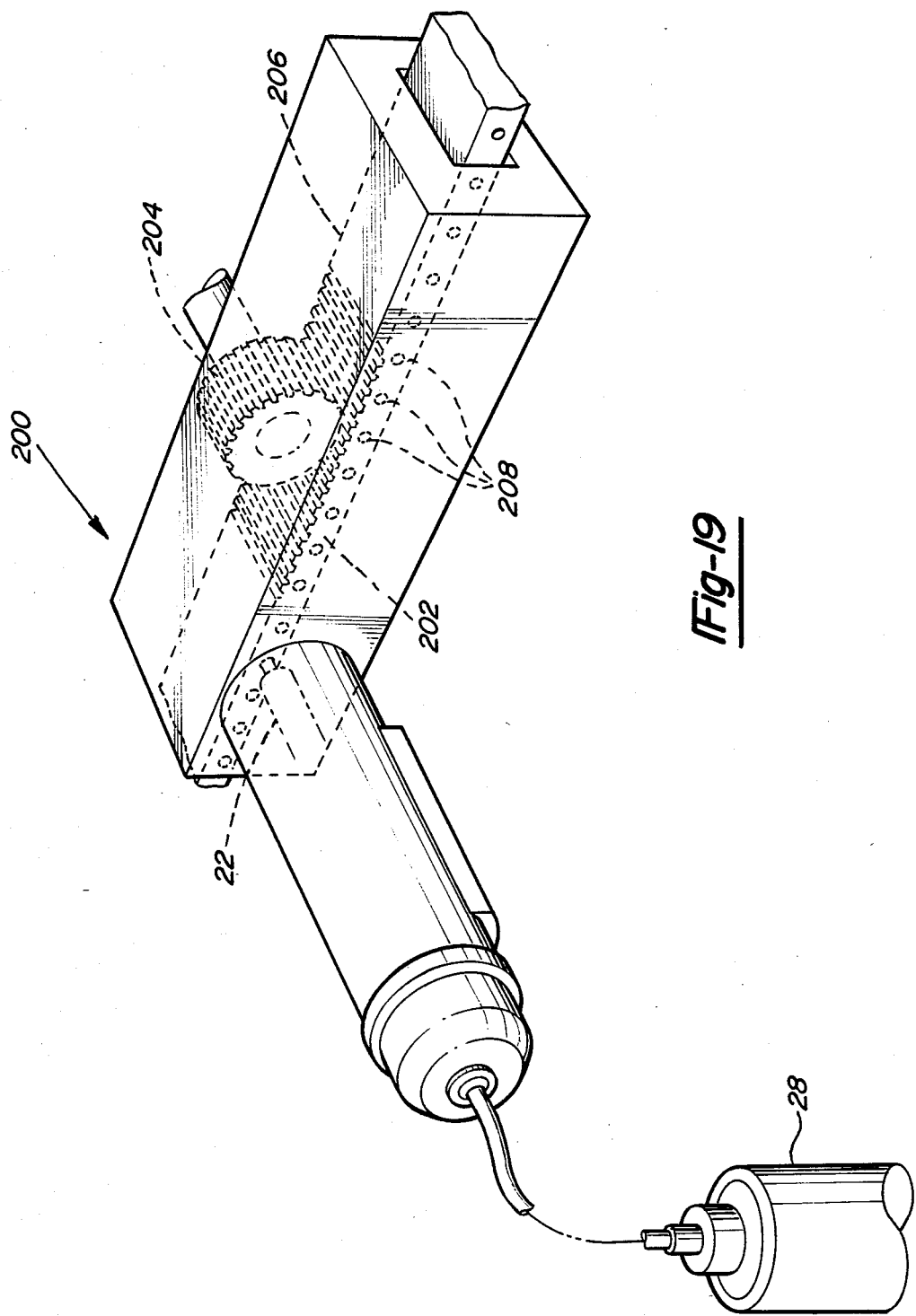
FIG. 19 is a perspective view, partially broken away of a scond environment of the present invention.

A second environment of the present invention is generally shown at 200 in FIG. 19 Like numerals are used to indicated like structures between the several embodiments.

In this embodiment, the locking assembly 22 is utilized to selectively lock the steering mechanism rack 202 from moving linearly thereby providing a second environment for the present invention whereby the present invention can be utilized to selectively lock and unlock the steering mechanism of a vehicle. More specifically, the rack 202 and pinion 204, schematically shown, and lock assembly 22 are contained within the rack and pinion housing 206. The rack 202 includes a plurality of openings 208 along the length thereof. The lock assembly 22 in mounted within the housing such that upon actuation of the lock assembly by the remote control 44, the shear pin (not shown) of the lock assemlby 22 engages one of the openings 208 and the rack 202 thereby preventing linear movement thereof. The bidirectional biasing mechanism operates in a substantially similar manner in this environment as it does with use of the rotor mounted on the steering wheel previously described. The bidirectional biasing mechanism will bias the shear pin into one of the openings 208 if the assembly is actuated and the shear pin is not aligned with one of the openings 208. The bidirectional biasing mechanism will also allow the assembly to be actuated to the unlocked condition when torque is applied to the rack 202 thereby capturing the shear pin therein. Once the assembly is actuated to the unlocked condition and the steering wheel is moved thereby moving the rack 202, the shear pin is released thereby unlocking the steering mechanism. Accordingly, the present invention can be adapted to be used with various moveable steering control mechanisms, such as the steering wheel shaft or rack of the rack and pinion assembly of the steering mechanism to provide an effective anti-theft device.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A steering wheel shaft lock assembly comprising: engagement means for mating engagement with an opening in a movable steering control mechanism; actuating means for selectively applying a force to move said engagement means towards mating engagement with the opening; and bidirectional biasing means operatively connected between said actuating means and said engagement means for biasing said engagement means towards engagement with the opening when said actuating means applies force thereagainst and said engagement means is unaligned with the opening and biasing said engagement means out of engagement with the opening when the force applied by said actuating means is selectively removed and the opening is applying a torque on said engagement means to retain said engagement means therein such that release of the torque disengages said engagement means.

2. An assembly as set forth in claim 1 including an outer housing and an inner housing contained therein for sliding movement relative thereto, said inner housing being operatively connected to said actuating means for moving axially within said outer housing, said engagement means including a body portion contained within said inner housing and a projecting portion extending therefrom for mating engagement with the opening upon axial movement of said inner housing, said bidirectional biasing means including a first spring contained within said inner housing against one side of said body portion for biasing said body portion towards engagement with the opening and a second spring contained within said inner housing on the opposite side of a said body portion biasing said body portion away from engagement with the opening.

3. An assembly as set forth in claim 2 wherein the moving steering control mechanism is a steering wheel shaft, said assembly including a rotor including connecting means for fixedly connecting said rotor about the steering wheel shaft, said rotor including an annual outer surface having a series of equally spaced radially extending openings disposed thereabout, said engagement means selectively engaging one of said openings to lock the steering shaft from rotation, said rotor being contained within said outer housing.

4. An assembly as set forth in claim 3 including remote control means for generating a lock and unlock signal and communication means for translating said signal to said actuator means for engaging said engagement means into one of said openings in said rotor in response to said lock signal and disengaging said engagement means in response to said unlock signal.

5. An assembly as set forth in claim 4 wherein said communication means includes drive means operatively connected to said control means for being actuated thereby and drive cable means operatively connected between said drive means and said actuator means for being axially rotated thereby in response to said signals from said control means, said actuator means including translation means for translating said rotational movement of said driven cable into axial movement of said engagement means.

6. An assembly as set forth in claim 5 wherein said actuator means includes a drive connector member contained within said outer housing for axial sliding movement relative thereto and fixedly connected to said drive cable for rotational movement driven thereby said translation means including a drive screw member having a first end in locked engagement with said drive connector member and a second threaded end, said actuator means including a driven member contained within said inner housing for axial sliding movement relative thereto, and said first spring being in abutting contact between said driven member and said body portion of said engagement means, said driven member including a threaded bore in one end thereof in mating threaded engagement with said threaded end portion of said drive screw member, said outer housing including anti-rotation means connected to said inner housing and said driven member for preventing relative rotation therebetween.

7. An assembly as set forth in claim 6 wherein said driven member includes an annular shoulder, said first spring having one end abutting against said shoulder and a second end abutting against one side of side body portion, said body portion having a second side including an annular shoulder and said inner housing including an end wall, said second spring including a first end abutting said shoulder of said body portion and a second end abutting against said end wall.

8. An assembly as set forth in claim 6 wherein said inner housing includes an axially extending first slot therethrough and said driven member includes an axially extending second slot therethrough which is coaxial with said first slot, said anti-rotation means including at least one pin member extending from said outer having and through said first and second slots for preventing relative rotation therebetween.

9. An assembly as set forth in claim 6 wherein said body portion includes an axially extending bore, said driven member including a rod portion extending therefrom through said first spring and in mating engagement with said axially extending bore of body portion, said rod portion including an axial center portion midway along the length thereof, said assembly including centering means for urging said body portion towards being seated over said axial center portion.

10. An assembly as set forth in claim 9 wherein said body portion includes a pair of coaxial ports extending therethrough in a direction radially outwardly relative to said axially extending bore, said rod portion including a groove along said length thereof which tapers inwardly towards said axial center portion, said centering means including a spring and a bearing mounted on the end thereof disposed in each of said ports wherein said springs engage said body portion and said bearings each engage one of said grooves.

11. An assembly as set forth in claim 5 including inhibitor means for inhibiting disengagement of said engagement means from the steering control mechanism when said drive cable is cut along the length thereof.

12. An assembly as set forth in claim 1 including a fixed plate disposed between said drive connector member and said driven member, said drive screw member extending through said fixed plate and being rotatable and axially fixed relative thereto, said assembly including biasing means disposed between said fixed plate and said driver connector member for biasing said driver connector member towards said drive cable and out of operative connection with said drive screw member, said drive cable being in compression between said drive means and said driver connector member for applying a force to said driver connector member opposite in direction to said biasing means, said driver connector member including at least one inhibitor port therein extending radially outwardly from an axial center thereof, said outer housing including an annular recess therein, said inhibitor means including outwardly biased locking pin members disposed in said inhibitor ports whereby cutting of said drive cable allows said biasing means to axially bias said drive connector member through said inner housing to align said outwardly biased locking pin members with said recess, said locking pin members seating in said recess to prevent any further axial movement of said driver connector member and maintaining said driver connector member out of operative engagement with said drive screw member.

13. An assembly as set fort in claim 9 including latch means for positively latching said inner housing and said body portion from axial movement relative to said outer housing when said control means generates said unlock signal.

14. An assembly as set forth in claim 13 wherein said latch means includes a latch member having a locking end portion and being pivotally mounting within said outer housing, said body portion including a latch receiving opening therein, said locking end portion latching into said latch receiving opening when said control means generates said unlock signal.

15. An assembly as set forth in claim 14 wherein said control means includes an indicator light operatively connected to said latch means for illuminating when said latch means engages said body portion to indicate that said engagement means is secured out of engagement with the steering control mechanism.

16. A steering wheel lock assembly as set forth in claim 1 wherein the steering control mechanism is a rack of a rack and pinion steering control, the rack including a plurality of the openings extending along the length thereof, said assemlby being mounted adjacent thereto for engagement and disengagement of said opening to selectively fixedly lock the rack from linear movement relative to the pinion.

* * * * *